(12) United States Patent
Kim et al.

(10) Patent No.: US 8,309,252 B2
(45) Date of Patent: Nov. 13, 2012

(54) ANODE ACTIVE MATERIAL, METHOD OF PREPARING THE SAME, AND ANODE AND LITHIUM BATTERY CONTAINING THE MATERIAL

(75) Inventors: Han-su Kim, Yongin-si (KR); Sang-kook Mah, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 64 days.

(21) Appl. No.: 12/900,404

(22) Filed: Oct. 7, 2010

(65) Prior Publication Data
US 2011/0024676 A1    Feb. 3, 2011

Related U.S. Application Data

(62) Division of application No. 11/850,586, filed on Sep. 5, 2007, now Pat. No. 7,833,662.

(30) Foreign Application Priority Data

Jan. 5, 2007   (KR) .................... 10-2007-0001658

(51) Int. Cl.
H01M 4/90   (2006.01)
(52) U.S. Cl. .................... 429/218.1; 429/209
(58) Field of Classification Search ............ 429/218.1
See application file for complete search history.

(56) References Cited

U.S. PATENT DOCUMENTS

| | | | |
|---|---|---|---|
| 6,083,644 A | 7/2000 | Watanabe et al. |
| 6,432,579 B1 | 8/2002 | Tsuji et al. |
| 2003/0053945 A1 | 3/2003 | Fukuoka et al. |
| 2003/0215711 A1 | 11/2003 | Aramata et al. |
| 2004/0106040 A1 | 6/2004 | Fukuoka et al. |
| 2005/0214644 A1 | 9/2005 | Aramata et al. |
| 2005/0233213 A1 | 10/2005 | Lee et al. |
| 2006/0003227 A1 | 1/2006 | Aramata et al. |
| 2006/0134518 A1 | 6/2006 | Kogetsu et al. |
| 2007/0026318 A1 | 2/2007 | Kishi et al. |
| 2007/0059601 A1 | 3/2007 | Natsume et al. |
| 2007/0166624 A1 | 7/2007 | Taniguchi et al. |
| 2008/0032192 A1 | 2/2008 | Yokomizo et al. |

(Continued)

FOREIGN PATENT DOCUMENTS

CN    1428880 A    7/2003

(Continued)

OTHER PUBLICATIONS

Yoshio Idota, et al., *Tin-Based Amorphous Oxide: A High-Capacity Lithium-Ion-Storage Material*, Science 276, 1395 (1997); www.science.org, vol. 276, pp. 1395-1397; May 30, 1997.

(Continued)

*Primary Examiner* — Robert Hodge
*Assistant Examiner* — Stephen Yanchuk
(74) *Attorney, Agent, or Firm* — Christie, Parker & Hale, LLP (57) ABSTRACT

Silicon oxide based composite anode active materials including amorphous silicon oxides are provided. In one embodiment, the amorphous silicon oxide is represented by $SiO_x$ (where $0<x<2$), has a binding energy of about 103 to about 106 eV, a silicon peak with a full width at half maximum (FWHM) ranging from about 1.6 to about 2.4 as measured by X-ray photoelectron spectrometry, and an atomic percentage of silicon greater than or equal to about 10 as calculated from an area of the silicon peak. The anode active material is a composite anode active material obtained by sintering hydrogen silsesquioxane (HSQ). Anodes and lithium batteries including the anode active material exhibit improved charge and discharge characteristics.

7 Claims, 4 Drawing Sheets

U.S. PATENT DOCUMENTS

| | | | |
|---|---|---|---|
| 2008/0113269 A1 | 5/2008 | Yamamoto et al. | |
| 2009/0047577 A1 | 2/2009 | Iwamoto et al. | |

FOREIGN PATENT DOCUMENTS

| | | |
|---|---|---|
| CN | 1674325 A | 9/2005 |
| CN | 1781200 A | 5/2006 |
| DE | 10-2004-017 889 A1 | 12/2004 |
| JP | 10-233211 | 9/1998 |
| JP | 2997741 | 11/1999 |
| JP | 2002-216753 | 8/2002 |
| JP | 2004-047404 | 2/2004 |
| JP | 2004-349237 | 12/2004 |
| JP | 2006-107912 A | 4/2006 |
| KR | 10-1999-0077427 A | 10/1999 |
| KR | 10-2005-0013841 | 2/2005 |
| KR | 10-2006-0069295 A | 6/2006 |
| WO | WO 2005/047199 | 5/2005 |

OTHER PUBLICATIONS

Morita, T., et al., *Nano Si Cluster-SiOx-C Composite Material as High-Capacity Anode Material for Rechargeable Lithium Batteries*, Journal of the Electrochemical Society, vol. 153 (2), (2006), pp. A425-A430.

Miyachi, M., et al., *Electrochemical Properties and Chemical Structures of Metal-Doped SiO Anodes for Li-Ion Rechargeable Batteries*, Journal of the Electrochemical Society, vol. 154 (4), (2007), pp. A376-A380.

U.S. Office action dated Nov. 5, 2009, for related U.S. Appl. No. 11/861,200.

Chinese Office action dated Jun. 12, 2009, for corresponding Chinese application 200810001626.9, with English translation.

U.S. Office action dated Jan. 10, 2012, for U.S. Appl. No. 12/251,315, 14 pages.

SIPO Office action dated Dec. 5, 2011, for Chinese Patent application 200810001626.9, with English translation, 6 pages.

Japanese Office action dated Jun. 28, 2011, for Japanese Patent application 2007-339901, 2 pages.

SIPO Office action dated May 16, 2011, for Chinese Patent application 200810005625.1, and English translation, noting listed reference in this IDS, as well as U.S. Publication 2005/0214644, previously submitted in an IDS dated Feb. 11, 2010.

Japanese Office action dated Jun. 5, 2012, for corresponding Japanese Patent application 2007-339901, (2 pages).

SIPO Patent Certificate Serial No. ZL 200810001626.9 issued on Jul. 18, 2012, with partial English translation, 19 pages.

ANODE ACTIVE MATERIAL, METHOD OF PREPARING THE SAME, AND ANODE AND LITHIUM BATTERY CONTAINING THE MATERIAL

CROSS-REFERENCE TO RELATED PATENT APPLICATION

This application is a divisional of application Ser. No. 11/850,586, now U.S. Pat. No. 7,833,662 filed Sep. 5, 2007, which claims priority to and the benefit of Korean Patent Application No. 10-2007-0001658, filed on Jan. 5, 2007 in the Korean Intellectual Property Office, the entire content of which is incorporated herein by reference.

BACKGROUND OF THE INVENTION

1. Field of the Invention

The present invention relates to anode active materials, methods of preparing the same, and anodes and lithium batteries containing the materials. More particularly, the invention is directed to anode active materials having particular silicon peaks as measured by X-ray photoelectron spectrometry.

2. Description of the Related Art

In an effort to achieve high voltages and energy densities, research and development has been extensively conducted into non-aqueous electrolyte secondary batteries using lithium compounds as anodes. Specifically, metallic lithium has become the subject of intense research due to its ability to impart high initial battery capacity. Accordingly, lithium has gained great attention as a prominent anode material. However, when metallic lithium is used as an anode material, large amounts of lithium are deposited on the surface of the anode in the form of dendrites, which may degrade charge and discharge efficiencies or cause internal-shorts between the anode and the cathode (positive electrode). Further, lithium is very sensitive to heat or impact and is prone to explosion due to its instability, i.e., high reactivity, which has held up commercialization. In order to eliminate these problems with the use of metallic lithium, carbonaceous materials have been proposed for use as anode materials. Carbonaceous anodes perform redox reactions such that lithium ions in the electrolytic solution intercalate/deintercalate in the carbonaceous material which has a crystal lattice structure during charge and discharge cycles. These anodes are referred to as "rocking chair type" anodes.

The carbonaceous anode has made a great contribution to the widespread use of lithium batteries by overcoming various disadvantages associated with metallic lithium. However, electronic equipment are becoming smaller and more lightweight, and the use of portable electronic instruments is becoming more widespread, making the development of lithium secondary batteries having higher capacities a major focal point. Lithium batteries using carbonaceous anodes have low battery capacity because of the porosity of the carbonaceous anode. For example, graphite (which is an ultra-high crystalline material), when used in a $LiC_6$ structure (made by reaction of graphite with lithium ions), has a theoretical capacity density of about 372 mAh/g. This is only about 10% that of metallic lithium, i.e., 3860 mAh/g. Thus, in spite of many problems with conventional metallic anodes, studies for improving battery capacity using metallic lithium as the anode material are actively being carried out.

A representative example of such studies is the use of materials that can alloy with lithium, e.g., Si, Sn, Al, or the like, as anode active materials. However, materials that can alloy with lithium, such as Si or Sn, may present several problems, including volumetric expansion during formation of the lithium alloy, creation of electrically disconnected active materials in an electrode, aggravation of electrolytic decomposition, and so on.

In order to overcome these problems with the use of such a metallic material, a technique of using a metal oxide exhibiting a relatively low volumetric expansion as an anode active material has been proposed. For example, use of an amorphous Sn-based oxide has been proposed which minimizes the Sn particle size and prevents agglomeration of Sn particles during charge and discharge cycles, thereby leading to improvement of capacity retention characteristics. However, Sn-based oxides unavoidably cause reactions between lithium and oxygen atoms, which is responsible for considerable irreversible capacities.

High capacity electrodes using silicon oxides as the anode materials for secondary lithium ion batteries have also been proposed. However, irreversible capacities are considerably large during initial charge-discharge cycling stages, giving the secondary lithium ion batteries undesirable cycling characteristics and preventing practical use.

SUMMARY OF THE INVENTION

In one embodiment of the present invention, a silicon oxide based composite anode active material has a particular silicon peak as measured by X-ray photoelectron spectrometry.

In another embodiment of the present invention, an anode contains the anode active material. In yet another embodiment, a lithium battery include the anode active material, and the battery exhibits improved charge and discharge efficiency and charge and discharge capacity.

In still another embodiment of the present invention, a method of preparing the anode active material is provided.

According to an embodiment of the present invention, a silicon oxide based composite anode active material includes an amorphous silicon oxide represented by the general formula $SiO_x$ (where $0<x<2$), having a binding energy ranging from about 103 to about 106 eV and a silicon peak with a full width at half maximum (FWHM) ranging from about 1.6 to about 2.4 as measured by X-ray photoelectron spectrometry, and having an atomic % greater than or equal to about 10, as calculated from an area of the peak.

According to another embodiment of the present invention, an anode comprises the anode active material. In another embodiment, a lithium battery includes the anode active material.

According to another embodiment of the present invention, a method of preparing the anode active material includes sintering hydrogen silsesquioxane (HSQ) in an inert atmosphere at a temperature ranging from about 900 to about 1300° C.

Unlike conventional anode active materials derived from silicon dioxide, anode active materials according to embodiments of the present invention include amorphous silicon oxide having a novel structure, thereby improving initial charge and discharge efficiency. In addition, anodes and lithium batteries including the anode active materials of the present invention exhibit excellent charge and discharge characteristics.

BRIEF DESCRIPTION OF THE DRAWINGS

The above and other features and advantages of the present invention will be better understood by reference to the following detailed description when considered in conjunction with the attached drawings in which.

DETAILED DESCRIPTION OF THE INVENTION

A silicon oxide based composite anode active material according to one embodiment of the present invention includes an amorphous silicon oxide represented by the general formula $SiO_x$ (0<x<2), having a binding energy ranging from about 103 to about 106 eV and a silicon peak with a full width at half maximum (FWHM) ranging from about 1.6 to about 2.4 as measured by X-ray photoelectron spectrometry, and having an atomic % greater than or equal to about 10, as calculated from an area of the peak.

Figure 1:
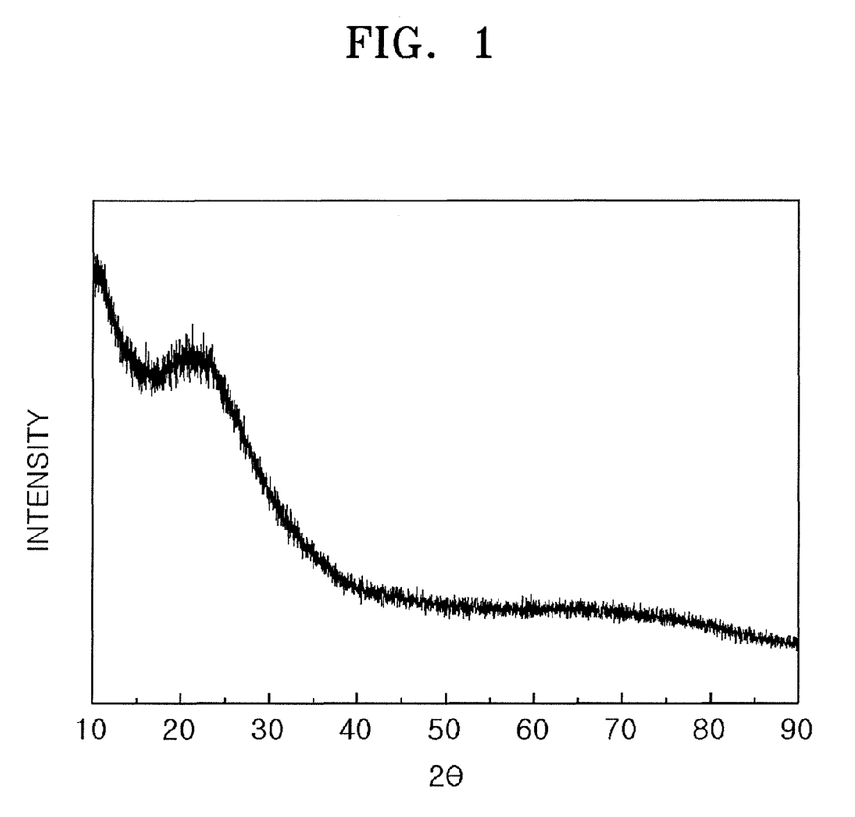
FIG. 1 depicts the X-ray diffraction patterns of the anode active material powders prepared according to Example 1 and Comparative Example 1.

The X-ray diffraction results shown in FIG. 1, indicate that the amorphous silicon oxide has an amorphous phase without a peak for crystallinity.

In addition, the amorphous silicon oxide ($SiO_x$) according to an embodiment of the present invention has a silicon (Si) atomic % of greater than about 10%. In addition, the silicon (Si) has a relatively high binding energy of, e.g., 105.4 eV, as measured by X-ray photoelectron spectrometry, unlike conventional silicon oxide (SiO).

The Si has a high atomic % and a high binding energy presumably because the amorphous silicon oxide ($SiO_x$) according to an embodiment the present invention includes a nanopore structure. The amorphous silicon oxide ($SiO_x$) having the nanopore structure intercalates/deintercalates lithium ions highly efficiently compared to conventional silicon oxide.

In one exemplary embodiment, the amorphous silicon oxide ($SiO_x$) has a binding energy ranging from about 105 to about 106 eV as measured by X-ray photoelectron spectrometry, and a Si peak with a full width at half maximum (FWHM) ranging from about 1.8 to about 2.2.

In another exemplary embodiment, the amorphous silicon oxide ($SiO_x$) has the general formula $SiO_x$ (where 1<x<1.7). The atomic % of the amorphous silicon oxide ($SiO_x$), calculated from an area of the silicon peak, is greater than or equal to about 8. In one embodiment, for example, the atomic % ranges from about 8 to about 10.8%.

According to one embodiment, the amorphous silicon oxide ($SiO_x$) may be prepared by sintering hydrogen silsesquioxane (HSQ). HSQ, represented by the general formula $HSiO_{3/2}$, is a kind of polyhedral oligomeric silsesquioxane (POSS). Before heat treatment, the POSS has a cage structure, a network structure, or a mixed structure of cage and network structures. After heat treatment, the structure of the POSS may be transformed into a network structure. The POSS is a low dielectric material that can prepare mesoporous materials having small pores with specified diameters using a sol-gel method. In addition, the POSS has been researched as a semiconductor insulator material. However, no method of using the POSS as an anode active material has yet been reported. In one embodiment of the present invention, a composite anode active material contains a new amorphous silicon oxide obtained by directly sintering HSQ (that does not have carbon atoms) at a high temperature of about 900° C.

The HSQ used in preparing the silicon oxide based composite anode active material may be obtained by a sol-gel reaction of a silane compound. In the sol-gel reaction, a silane compound having low molecular weight is subjected to hydrolysis and condensation under appropriate reaction conditions to obtain a sol having stable and uniformly structured inorganic particles dispersed therein. Alternatively, a gel may be produced by additional growth of the inorganic particles of the sol. In one embodiment of the present invention, HSQ of the general formula $HSiO_{3/2}$ is obtained by the sol-gel reaction of the silane compound.

The silane compound may be a silane compound represented by Formula (1).

$$HSi(R_1)(R_2)(R_3) \qquad (1)$$

In Formula (1), each of $R_1$, $R_2$ and $R_3$ is independently selected from halogen atoms, and substituted and unsubstituted $C_{1-10}$ alkoxy groups. Nonlimiting examples of suitable silane compounds include trichlorosilane, trimethoxy silane, and triethoxy silane.

The substituted alkoxy group of the silane compound of Formula (1) may include a substituent selected from $C_{1-5}$ alkyl groups, $C_{2-5}$ alkenyl groups, and $C_{1-5}$ alkoxy groups.

In the sol-gel reaction carried out for preparation of HSQ, the silane compound may be sol-gel reacted with from about 10 to about 60 wt % of a carbonaceous material based on the total weight of the mixture of the silane compound and the carbonaceous material. Addition of the carbonaceous material to the sol-gel reaction system yields a composite structure having the carbonaceous material contained in the HSQ.

When the HSQ having the composite structure is sintered, the silicon oxide based composite anode active material may further comprise carbonaceous particles dispersed within the amorphous silicon oxide.

In addition, when the HSQ is sintered according to one embodiment of the present invention, from about 10 to about 90 wt % of a carbon precursor may be added to the HSQ based on the total weight of the mixture of the HSQ and the carbon precursor. When adding the carbon precursor, the silicon oxide based composite anode active material may further comprise a carbonaceous coating layer. In other words, a silicon oxide based composite anode active material may further comprise a carbonaceous coating layer formed on the amorphous silicon oxide. The carbonaceous coating layer may be formed by entirely coating the amorphous silicon oxide particles.

In another embodiment of the present invention, an anode includes the anode active material. More specifically, an anode according to one embodiment of the present invention may be manufactured using a silicon oxide based composite anode active material, i.e., a porous anode active material.

The anode may be manufactured by, for example, forming a mixed anode material including the anode active material and a binder shaping the mixed anode material. Alternatively, the mixed anode material may be applied onto a current collector made of, e.g., copper foil.

More specifically, an anode composition may be prepared and then directly coated on a copper foil current collector to prepare an anode plate. Alternatively, the anode composition can be cast on a separate support to form a porous anode active material film, which film is then stripped from the support and laminated on the copper foil current collector, thereby obtaining an anode plate.

The anode of the present invention is not limited to the illustrated examples and many other modifications may be made within the scope of the invention.

To attain higher capacity batteries, large amounts of current are required to charge and discharge the higher capacity batteries, which require low resistance materials for the electrode materials. Thus, in order to reduce the resistance of the electrode, a variety of conducting materials are generally employed. Nonlimiting examples of suitable conducting materials include carbon black, and graphite fine particles.

Figure 4:
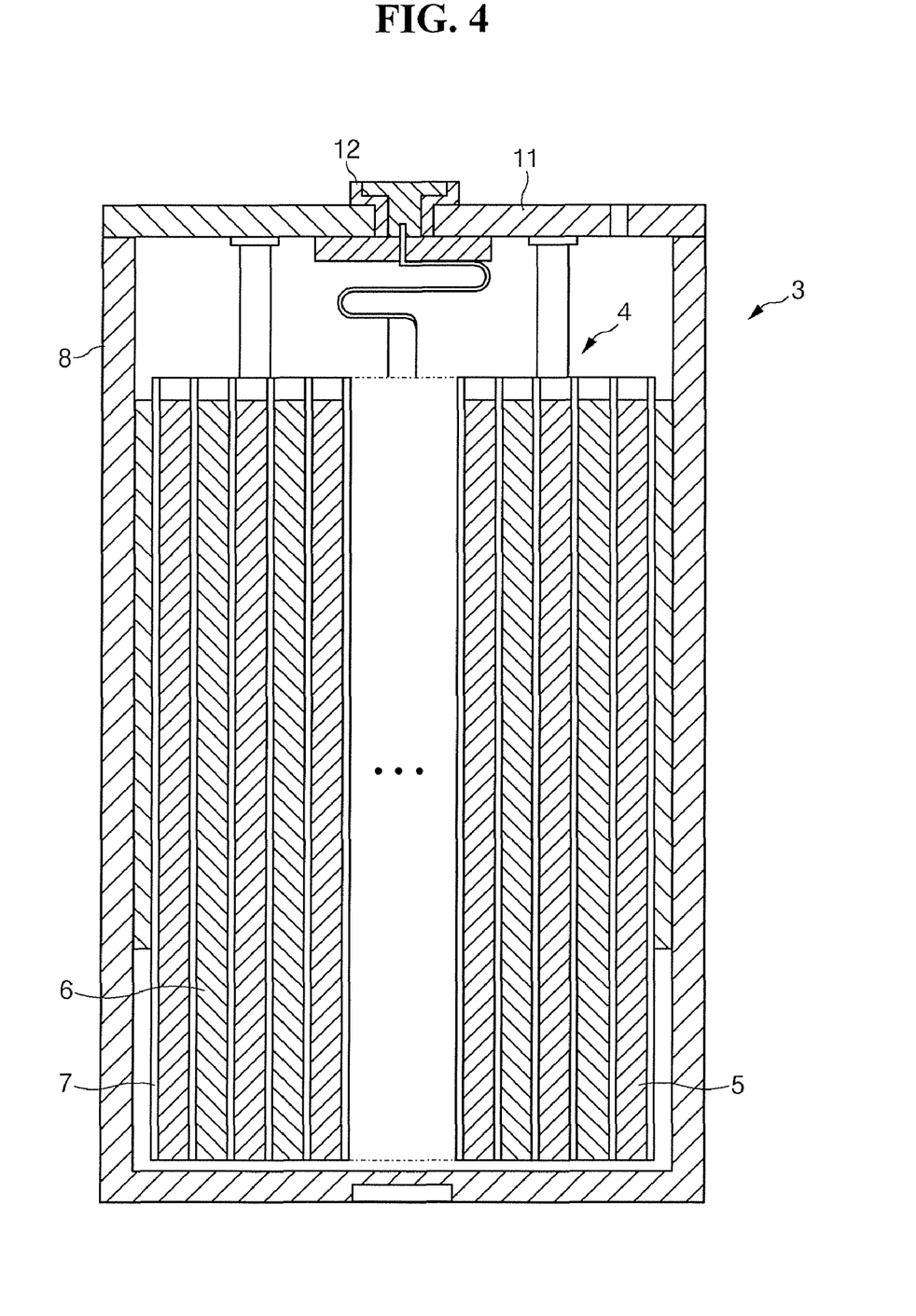
FIG. 4 is a cross-sectional view of a lithium battery according to one embodiment of the present invention.

According to another embodiment of the invention, a lithium battery includes the above anode. As shown in FIG. 4, the lithium battery 3 includes an electrode assembly 4 including a cathode 5, anode 6 and a separator 7 positioned between the cathode 5 and anode 6. The electrode assembly 4 is housed in a battery case 8, and sealed with a cap plate 11 and sealing gasket 12. An electrolyte is then injected into the battery case to complete the battery. A lithium battery according to one embodiment of the present invention may be prepared in the following manner.

First, a cathode active material, a conducting agent, a binder, and a solvent are mixed to prepare a cathode active material composition. The cathode active material composition is coated directly on a metallic current collector and dried to prepare a cathode electrode. In an alternative embodiment, the cathode active material composition is cast on a separate support body to form an anode active material film, which film is then peeled off the support body and laminated on the metallic current collector.

A lithium-containing metal oxide may be used as the cathode electrode active material. Nonlimiting examples of suitable lithium-containing metal oxides include $LiCoO_2$, $LiMn_xO_{2x}$, $LiNi_{x-1}Mn_xO_{2x}$ (where x=1, 2), and $LiNi_{1-x-y}Co_xMn_yO_2$ (where $0 \leq x \leq 0.5$, $0 \leq y \leq 0.5$). Specific, nonlimiting examples of suitable lithium-containing metal oxides include compounds capable of oxidizing and reducing lithium ions, such as $LiMn_2O_4$, $LiCoO_2$, $LiNiO_2$, $LiFeO_2$, $V_2O_5$, $TiS_2$, $MoS_2$, and the like.

Carbon black may be used as the conducting agent. Nonlimiting examples of suitable binders include vinylidene fluoride/hexafluoropropylene (HFP) copolymers, polyvinylidene difluoride (PVdF), polyacrylonitrile, polymethacrylate, polytetrafluoroethylene, and mixtures thereof. Styrene butadiene rubber polymers may also be used as the binder. Nonlimiting examples of suitable solvents include N-methyl-pyrrolidone, acetone, water, and the like. The amount of the cathode electrode active material, the conducting agent, the binder, and the solvent used in the manufacture of the lithium battery are amounts generally acceptable in the art.

Any separator commonly used in lithium batteries can be used in the lithium battery. In particular, an exemplary separator may have low resistance to migration of ions in an electrolyte and have excellent electrolyte-retaining ability. Nonlimiting examples of suitable separators include glass fibers, polyester, polyethylene, polypropylene, polytetrafluoroethylene (PTFE), and combinations thereof. The separator may be a rollable material in non-woven or woven fabric form. Specific nonlimiting examples of suitable separators for use in lithium ion batteries include polyethylene, polypropylene and the like. A separator that can retain large amounts of organic electrolytic solution may be used in lithium-ion polymer batteries. These separators may be manufactured by the following exemplary method.

A polymer resin, a filler and a solvent are mixed to prepare a separator composition. The separator composition is coated directly on the electrode, and then dried to form a separator film. Alternatively, the separator composition can be cast onto a separate support and dried to form a separator film, which film is then detached from the separate support and laminated on an electrode, thereby forming a separator film.

Any polymer resin commonly used in lithium batteries can be used in the separator. Nonlimiting examples of suitable polymer resins include vinylidenefluoride/hexafluoropropylene copolymers, polyvinylidenefluoride, polyacrylonitrile, polymethylmethacrylate and mixtures thereof.

The electrolyte may include a lithium salt dissolved in the electrolyte solvent. Nonlimiting examples of suitable electrolyte solvents include propylene carbonate, ethylene carbonate, diethyl carbonate, ethylmethyl carbonate, methylpropyl carbonate, butylene carbonate, benzonitrile, acetonitrile, tetrahydrofuran, 2-methyltetrahydrofuran, gamma-butyrolactone, dioxolane, 4-methyldioxolane, N,N-dimethyl formamide, dimethyl acetamide, dimethylsulfoxide, dioxane, 1,2-dimethoxyethane, sulfolane, dichloroethane, chlorobenzene, nitrobenzene, dimethyl carbonate, methylethyl carbonate, diethyl carbonate, methylpropyl carbonate, methylisopropyl carbonate, ethylpropyl carbonate, dipropyl carbonate, dibutyl carbonate, diethylene glycol, dimethyl ether, and mixtures thereof. Nonlimiting examples of suitable lithium salts include $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiSbF_6$, $LiAlO_4$, $LiAlCl_4$, $LiN(C_xF_{2x+1}SO_2)(C_yF_{2y+1}SO_2)$ (where each of x and y is a natural number), and mixtures thereof.

The separator is positioned between the cathode electrode and the anode electrode to form the electrode assembly. The electrode assembly is wound or folded and then sealed in a cylindrical or rectangular battery case. Then, the electrolyte solution is injected into the battery case to complete preparation of a lithium ion battery.

Alternatively, a plurality of electrode assemblies may be stacked in a bi-cell structure and impregnated with an organic electrolyte solution. The resultant product is put into a pouch and hermetically sealed, thereby completing a lithium ion polymer battery.

Still another embodiment of the present invention provides a method of preparing an anode active material. The method includes sintering hydrogen silsesquioxane (HSQ) in an inert atmosphere at a temperature ranging from about 900 to about 1300° C. The HSQ preferably has at least one structure selected from a structures represented by Formulae (2) and (3) and composite structures thereof.

(2)

(3)

In Formulae (2) and (3), R represents a hydrogen atom.

In an alternative embodiment of the present invention, the HSQ is obtained by subjecting the silane compound represented by Formula (1) to a sol-gel reaction in the presence of catalyst.

$$HSi(R_1)(R_2)(R_3) \qquad (1)$$

In Formula (1), each of $R_1$, $R_2$ and $R_3$ is independently selected from halogen atoms, and substituted and unsubstituted $C_{1-10}$ alkoxy groups. Nonlimiting examples of suitable silane compounds include trichlorosilane, trimethoxy silane, and triethoxy silane. The substituted alkoxy group may include a substituent selected from $C_{1-5}$ alkyl groups, $C_{2-5}$ alkenyl groups, and $C_{1-5}$ alkoxy groups.

According to an embodiment of the present invention, in the sol-gel reaction carried out for preparation of the HSQ, from about 10 to about 60 wt % of a carbonaceous material (based on the total weight of the mixture of the silane compound and the carbonaceous material) is sol-gel reacted with the silane compound. If the carbonaceous material is present in an amount less than about 10 wt %, the amount of carbon contained in the anode active material is too small making it the addition of the carbonaceous material meaningless to the reaction system. If the carbonaceous material is present in an amount greater than about 60 wt %, the excess of carbonaceous material may give rise to reductions in energy density. Nonlimiting examples of suitable carbonaceous materials include carbon black, graphite fine particles, amorphous carbon, carbon nanotubes, carbon nanofibers, and vapor-grown carbon fibers.

Alternatively, in the sintering of the HSQ, from about 10 to about 90 wt % of a carbon precursor may be added to the HSQ based on a total weight of the mixture of the HSQ and the carbon precursor. If the carbon precursor is added in an amount greater than about 90 wt %, energy density is undesirably reduced. If the carbon precursor is added in an amount less than about 10 wt %, the amount of carbon remaining after carbonization is too small to exhibit a meaningful effect. Nonlimiting examples of suitable carbon precursors include petroleum pitch, coal tar pitch, sucrose, phenol resins, epoxy resins, furfuryl alcohol, polyvinyl chloride, polyvinyl alcohol, and the like.

The present invention will now be described with reference to the following examples. However, these examples are presented for illustrative purposes only and are not intended to limit the scope of the present invention.

Preparation of Silicon Oxide

Example 1

1.5 g of triethoxy silane was added to 10 ml of ethanol and agitated for 30 minutes. 0.6 g of 0.5 M HCl solution was added to the resultant product and again agitated for 6 hours. After agitating, the resultant solution was allowed to stand undisturbed by external air at room temperature for 2 days until the solution was gelled.

Subsequently, the gelled solution was allowed to stand undisturbed in an oven maintained at about 80° C. for 2 days to evaporate ethanol and moisture, yielding white powder. The white powder was sintered under a flow of argon gas at a flow rate of 100 ml/min at about 900° C. for 1 hour, thereby preparing a silicon oxide ($SiO_x$).

Example 2

1 g of the silicon oxide powder prepared as in Example 1 and 0.4 g of petroleum pitch (Mitsubishi Chemical Co., Ltd., softening point: 250° C.) were added to 20 ml of THF (tetrahydrofuran), followed by agitating for 30 minutes. Subsequently, the resultant solution was continuously agitated to evaporate THF, yielding powder. The resultant powder was fired under a flow of argon gas at a flow rate of 100 ml/min at about 900° C. for 1 hour, thereby preparing a silicon oxide coated with a carbonaceous material.

Example 3

A $SiO_x$-graphite composite was prepared generally as in Example 1 except that 1.5 g of triethoxy silane was added to 10 ml of ethanol and 0.6 g of graphite powder (SFG-6 from Timcal Ltd.) was further added thereto, followed by agitating for 30 minutes.

Comparative Example 1

A silicon oxide (SiO) commercially available from Japan Pure Chemical Company Ltd. was used.

Comparative Example 2

A silicon oxide coated with a carbonaceous material was prepared as in Example 2 except that the silicon oxide (SiO) of Comparative Example 1 was used, instead of the silicon oxide ($SiO_x$) prepared in Example 1.

XRD (X-Ray Diffraction) Measurement

The structure of the amorphous silicon oxide ($SiO_x$) prepared in Example 1 was analyzed by XRD. The XRD results are shown in FIG. 1. As confirmed from FIG. 1, the XRD results indicated that the amorphous silicon oxide ($SiO_x$) prepared in Example 1 was amorphous.

XPS (X-Ray Photoelectron Spectrum) Measurement

XPS measurements were performed on the amorphous silicon oxide ($SiO_x$) prepared in Example 1 and the silicon oxide (SiO) prepared in Comparative Example 1. The equipment used for the XPS measurement was Model No. Q2000 of PHI XPS Systems. The XPS measurement was carried out with an X-ray source providing monochromatic Al Kα X-ray radiation with an energy of 1486.6 eV, 100 m. The XPS results are shown in Table 1 below and in FIG. 2.

TABLE 1

| Sample | Si2p(1)-99.2 eV | Si2p(2)-100.8 eV | Si2p(3)-103.0 eV | Si2p(4)-105.4 eV |
| --- | --- | --- | --- | --- |
| Comparative Example 1 | 6.6% | 2.12% | 23.35% | 2.1% |
| Example 1 | 1.5% | 1.08% | 16.64% | 10.8% |

Figure 2:
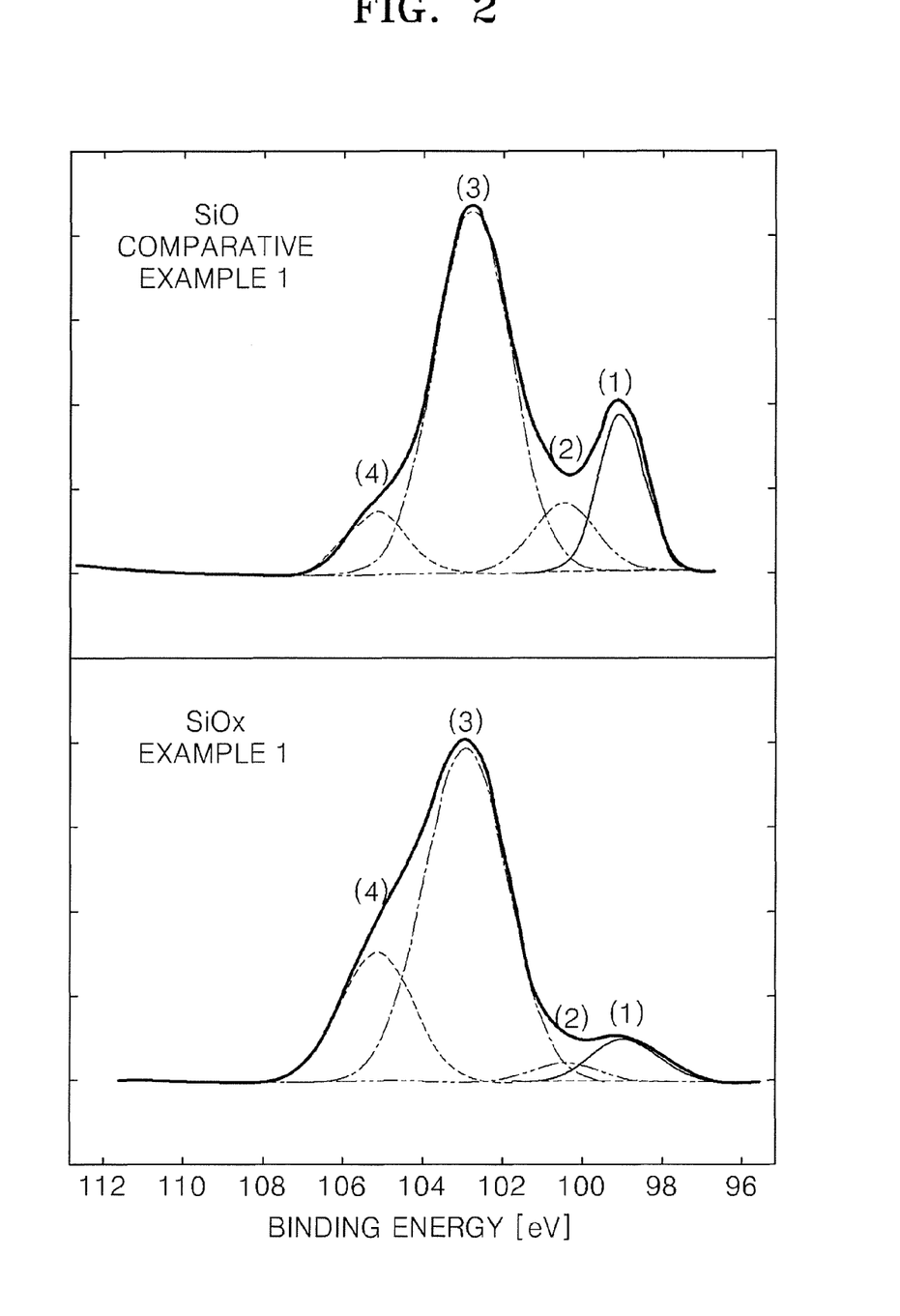
FIG. 2 depicts the results of X-ray photoelectron spectrometry of the anode active materials prepared according to Example 1 and Comparative Example 2.

As shown in Table 1 and FIG. 2, the atomic percentage (atomic %) of the amorphous silicon oxide ($SiO_x$) prepared in Example 1, obtained from a peak (4) of Si observed at 105.4 eV, was greater than 10%, while the atomic % of the silicon oxide (SiO) of Comparative Example 1 was less than 3%.

The amorphous silicon oxide ($SiO_x$) prepared in Example 1 had a relatively high Si atomic %, which is presumably because of its nanopore structure.

In FIG. 2, the peak (1) indicates an elemental silicon peak, the peak (3) indicates a $SiO_2$ peak, and the peak (2) indicates a non-stoichiometric silicon oxide.

Preparation of Anode

Example 4

The amorphous silicon oxide prepared according to Example 1, carbon black (Super-P from Timcal, Inc.), and vinylidene fluoride (PVdF) were mixed in a weight ratio of 75:15:10 with 1 mL NMP to prepare a slurry. The slurry was coated on a Cu foil collector to a thickness of about 50 μm using a doctor blade. The resultant Cu foil coated with the slurry was dried in vacuum at 120° C. for 2 hours, thereby preparing an anode.

Example 5

An anode was prepared as in Example 4 except that the silicon oxide prepared according to Example 2 was used instead of the silicon oxide prepared according to Example 1.

Example 6

An anode was prepared as in Example 4 except that the silicon oxide prepared according to Example 3 was used instead of the silicon oxide prepared according to Example 1.

Comparative Example 3

An anode was prepared as in Example 4 except that the silicon oxide prepared according to Comparative Example 1 was used instead of the silicon oxide prepared according to Example 1.

Comparative Example 4

An anode was prepared as in Example 4 except that the silicon oxide prepared according to Comparative Example 2 was used instead of the silicon oxide prepared according to Example 1.

Preparation of Lithium Battery

Example 7

A CR2016-standard coin cell was manufactured using the anode plate prepared according to Example 4, a counter electrode made of lithium metal, a PTFE separator (Cellgard 3510), and an electrolyte solution including 1.3 M $LiPF_6$ dissolved in a mixture of EC (ethylene carbonate) and DEC (diethyl carbonate) (3:7 by volume ratio).

Example 8

A CR2016-standard coin cell lithium battery was manufactured as in Example 7 except that anode plate prepared according to Example 5 was used instead of the anode plate prepared according to Example 4.

Example 9

A CR2016-standard coin cell lithium battery was manufactured as in Example 7 except that anode plate prepared according to Example 6 was used instead of the anode plate prepared according to Example 4.

Comparative Example 5

A CR2016-standard coin cell lithium battery was manufactured as in Example 7 except that anode plate prepared according to Comparative Example 3 was used instead of the anode plate prepared according to Example 4.

Comparative Example 6

A CR2016-standard coin cell lithium battery was manufactured as in Example 7 except that anode plate prepared according to Comparative Example 4 was used instead of the anode plate prepared according to Example 4.

Charge-Discharge Test

The coin cells prepared according to Examples 7 through 9 and Comparative Examples 5 and 6 were charged with a constant current of 100 mA with respect to 1 g of anode active materials to a cut-off voltage of 0.001 V (vs. Li), and a constant-voltage discharge was performed to a current of 5 mA with respect to 1 g of anode active materials while maintaining the 0.001 V potential. After a 30 minute rest time, the charged cells were discharged with a constant current of 50 mA with respect to 1 g of anode active materials until an endpoint voltage of 1.5 V was reached, thereby obtaining a discharge capacity. The charge-discharge tests were repeated for 50 cycles. The discharge capacity at each cycle was measured and a capacity retention rate was calculated using the measured discharge capacity. The capacity retention rate was calculated using Equation (1).

$$\text{Capacity retention ratio (\%)} = (\text{Discharge capacity at } 30^{th} \text{ cycle}/\text{Discharge capacity at } 1^{st} \text{ cycle}) \times 100 \quad \text{Equation (1)}$$

Figure 3A:
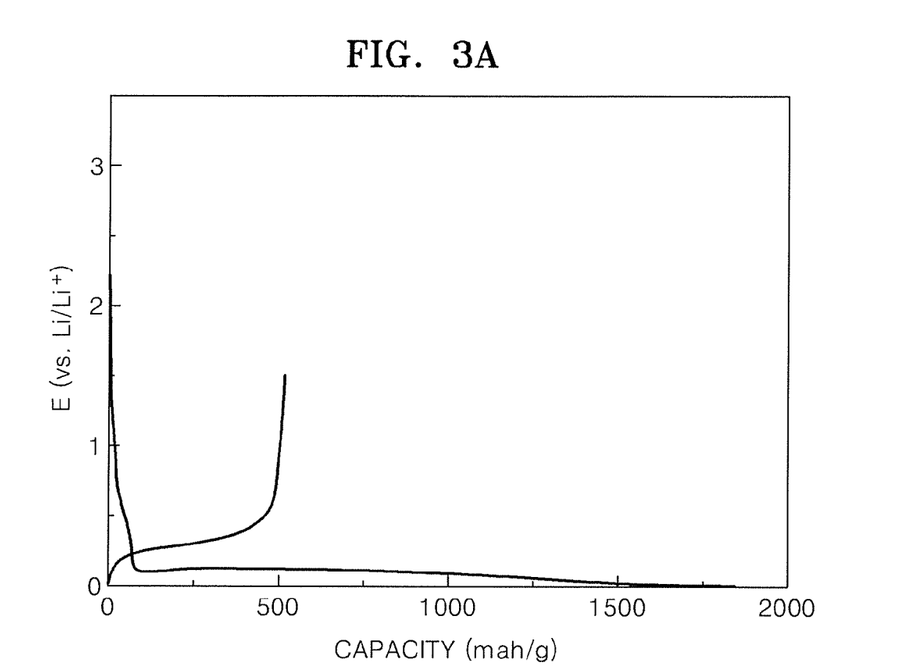
FIGS. 3A and 3B depict the electric potential to capacity relationship during the first charge and discharge cycle of lithium batteries employing the anode active materials prepared according to Example 1 and Comparative Example 1.
Figure 3B:
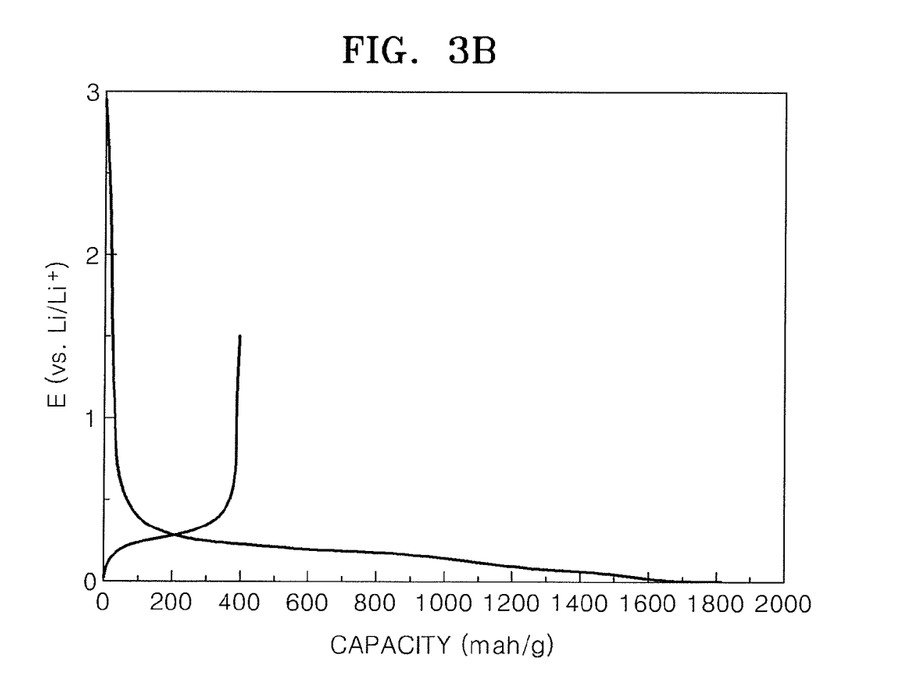

The results of the charge-discharge cycle tests for the coin cells prepared according to Examples 7 through 9 and Comparative Examples 5 and 6 are shown in Table 2 and in FIGS. 3A and 3B.

TABLE 2

| Coin Cell | 1st cycle discharge capacity (mAh/g) | 30th cycle discharge capacity (mAh/g) | Capacity retention ratio (%) |
|---|---|---|---|
| Example 7 | 516 | 99 | 19.3 |
| Example 8 | 905 | 546 | 60 |
| Example 9 | 736 | 477 | 64.8 |
| Comparative Example 5 | 393 | 35 | 9 |
| Comparative Example 6 | 427 | 26 | 6.1 |

As shown in FIGS. 3A and 3B, the coin cell using the amorphous silicon oxide prepared according to Example 7 (FIG. 3A) had substantially the same lithium intercalating capacity as the coin cell using the silicon oxide prepared according to Comparative Example 1 (FIG. 3B). However, the coin cell using the amorphous silicon oxide prepared according to Example 7 had a noticeably increased reversible lithium deintercalating capacity.

In addition, as shown in Table 2, the capacity retention ratios of the coin cells prepared according to Examples 7 through 9 were noticeably increased compared to those of the coin cells prepared according to Comparative Examples 5 and 6.

These results indicate that charge and cycle life characteristics of a battery can be noticeably improved when an anode active material according an embodiment of the present invention is used. As confirmed from the XPS experiment results, the amorphous silicon oxides ($SiO_x$) of the present invention have nanopore structures, and atomic % s of Si greater than 10%, yielding having high binding energies, leading to excellent lithium ion intercalation/deintercalation characteristics.

Unlike in methods of preparing conventional silicon oxides, which require sintering at high temperatures of 1200° C. or higher and rapid cooling, the anode active materials according to the present invention can be simply prepared by sintering under an inert atmosphere.

The inventive anode active materials are composite anode active materials containing novel amorphous silicon oxides directly obtained by sintering hydrogen silsesquioxane (HSQ). Anodes and lithium batteries including such anode active materials exhibit improved charge and discharge characteristics.

While the present invention has been illustrated and described with reference to certain exemplary embodiments, it is understood by those of ordinary skill in the art that various changes and modifications may be made to the described embodiments without departing from the spirit and scope of the present invention as defined by the following claims.

What is claimed is:

1. A method of preparing a silicon oxide based composite anode active material, the method comprising sintering hydrogen silsesquioxane in an inert atmosphere at a temperature ranging from about 900 to about 1300° C., wherein the silicon oxide based composite anode active material comprising an amorphous silicon oxide is represented by $SiO_x$, wherein $0<x<2$, the amorphous silicon oxide having a binding energy ranging from about 103 to about 106 eV and a silicon peak with a full width at half maximum (FWHM) ranging from about 1.6 to about 2.4 as measured by X-ray photoelectron spectrometry, wherein the amorphous silicon oxide has an atomic percentage of Si calculated from an area of the silicon peak of greater than or equal to about 8.

2. The method of claim 1, wherein the hydrogen silsesquioxane comprises a structure selected from the group consisting of structures represented by Formula (2), Formula (3), and composite structures thereof:

(2)

(3)

wherein R is hydrogen.

3. The method of claim 1, wherein the hydrogen silsesquioxane is prepared by subjecting a silane compound represented by Formula (1) to a sol-gel reaction in the presence of a catalyst:

$$HSi(R_1)(R_2)(R_3) \tag{1}$$

wherein each of $R_1$, $R_2$ and $R_3$ is independently selected from the group consisting of halogen atoms, and substituted and unsubstituted $C_{1-10}$ alkoxy groups.

4. The method of claim 3, wherein the sol-gel reaction comprises sol-gel reacting the silane compound with a carbonaceous material, wherein the carbonaceous material is present in an amount ranging from about 10 to about 60 wt % based on a total weight of the silane compound and the carbonaceous material.

5. The method of claim 4, wherein the carbonaceous material is selected from the group consisting of carbon black, graphite fine particles, amorphous carbon, carbon nanotubes, carbon nanofibers, vapor-grown carbon fibers and combinations thereof.

6. The method of claim 1, wherein the sintering hydrogen silsesquioxane comprises adding a carbon precursor to the hydrogen silsesquioxane, the carbon precursor being present in an amount ranging from about 10 to about 90 wt % based on a total weight of the hydrogen silsesquioxane and the carbon precursor.

7. The method of claim 6, wherein the carbon precursor is selected from the group consisting of petroleum pitch, coal tar pitch, sucrose, phenol resin, epoxy resin, furfuryl alcohol, polyvinyl chloride, polyvinyl alcohol and combinations thereof.

* * * * *